Sept. 23, 1969    C. H. TOWNES ET AL    3,469,107
STIMULATED BRILLOUIN PARAMETRIC DEVICES
Filed Aug. 14, 1964    3 Sheets-Sheet 1

INVENTORS
BORIS P. STOICHEFF
CHARLES H. TOWNES
ELSA M. GARMIRE
RAYMOND Y. CHIAO

BY, *Robert T Dunn*

ATTORNEY

BORIS P. STOICHEFF
CHARLES H. TOWNES
ELSA M. GARMIRE
RAYMOND Y. CHIAO

BY, *Robert T Dunn*

ATTORNEY

United States Patent Office
3,469,107
Patented Sept. 23, 1969

3,469,107
STIMULATED BRILLOUIN PARAMETRIC
DEVICES
Charles H. Townes, Cambridge, Mass., Elsa M. Garmire, Pasadena, Calif., Raymond Y. Chiao, Boston, Mass., and Boris P. Stoicheff, Willowdale, Ontario, Canada, assignors to Massachusetts Institute of Technology, Cambridge, Mass., a corporation of Massachusetts
Filed Aug. 14, 1964, Ser. No. 389,595
Int. Cl. H03k 3/47; H03f 7/00
U.S. Cl. 307—88.3        37 Claims

ABSTRACT OF THE DISCLOSURE

This invention relates to devices producing coherent wave energy through the process of amplification by stimulated emission and more particularly to a device wherein an exchange of energy occurs between electromagnetic and material waves.

The exchange of energy between an incident electromagnetic wave and matter results in scattering of electromagnetic radiation of different frequency from the incident radiation. Two such effects generally are referred to as Raman scattering and Brillouin scattering. The Raman scattering of incident electromagnetic radiation occurs when the incident radiation passes through a medium and interacts with an atom or molecule resulting in a change of state of the atom or molecule and as a result of this interaction electromagnetic radiation of a different frequency from the incident radiation is scattered by the medium. The frequency of the incident radiation $\omega_0$ is related to the frequency of the scattered radiation $\omega_1$ and the energy state E of the molecule by $\hbar\omega_0 = \hbar\omega_1 + E$. In the ordinary Raman effect, the scattered radiation is emitted spontaneously in all directions from the molecule. Generally, the intensity of the scattered radiation is only an extremely small fraction of the intensity of the incident radiation beam and is best observed at right angles to the incident beam to exclude as much of the incident beam from the observation as possible.

A similar type of scattering reported by L. Brillouin in Annales de Physique (1922) describes scattering from macroscopic density fluctuations rather than the microscopic atoms or molecules described by the Raman effect. Since moving density fluctuations may be Fourier analyzed into a number of acoustic waves each of fixed wave vector, Brillouin suggested that the incident light is reflected from the compression planes or wavefronts of these thermal acoustic waves. This means that a large region of the scattering medium encompassed by a number of wavefronts contributes constructively to the scattering. In accordance with the Brillouin effect, the frequency of the scattered radiation or light is related to the angle between the incident and scattered light; more particularly Brillouin found that the ratio of frequencies of the acoustic wave to the incident light is directly proportional to the sine of half the angle between the incident and scattered light. This relation can be found simply by conserving energy and momentum in the scattering process. Brillouin scattering can also be looked at as the Doppler shift of incident light reflected from a moving acoustic wavefront. This Doppler shift may be up or down depending upon the relative direction of the acoustic wave to the incident light wave.

The Brillouin scattering effects have been studied in the past by observing the scattered radiation at shifted frequency relative to the incident radiation. These studies were limited by the very low intensity of scattered radiation relative to the incident radiation. No attempt was made to look directly at the acoustic waves, for they are always present in materials at a finite temperature. This Brillouin scattering did not change the distribution of thermal sound waves because it was so weak. Furthermore, shifts up and down in frequency occurred with equal probabilities so that there was no net creation or absorption of sound waves due to the incident light. This was because heretofore, there was no mechanism for causing an amplification of either the scattered radiation or the acoustic waves.

Two basic mechanisms whereby wave energy can be amplified due to stimulated emission are by creating a population inversion and by pumping coherent energy into a medium through which the wave energy propagates. Both these processes for amplification of a wave are well known. The process of amplification by stimulated emission due to population inversion occurs in the laser in its many varieties in current use. The process of amplification by stimulated emission due to coherent pumping occurs in the parametric amplifier in its many forms in current use. In many forms of laser devices in current use, substantially incoherent pump energy is fed to a medium producing an inversion of population of energy states within the medium, these inversions being accomplished in a substantially incoherent manner. Once this population inversion is achieved, stimulated emission can occur which amplifies waves already present.

The second mechanism produces stimulated emission, however, without a population inversion. If the pumping energy is coherent, the system can be driven coherently and the phase relations set up in the medium can allow amplification by stimulated emission even without population inversion. When the medium is nonlinear, the amplified wave may be of another frequency. Parametric amplification is the generation of two such waves from an inital wave by this process. Parametric amplifiers in current use employ ferroelectric or ferromagnetic media to which coherent pump energy is applied causing a cyclical variation in the electric or magnetic permeability of the medium so that the amplitude of incident signal waves which propagates through the medium is increased. The frequencies of the pumping energy and signal energy and the extent to which the permeability of the medium can be altered by the pumping energy all contribute to the magnitude of the amplification of the signal wave. Non-linear combining or mixing of two waves producing sum and difference frequencies may also occur by the process of stimulated emission due to phase coherence. This phenomenon is in general use for the production of harmonics and sum frequencies of laser light using non-linear crystals. The mechanism for mixing arises from the dependence of the dielectric constant on electric field. This dependence arises from the fundamental non-linear response of atoms or molecules to high intensity electric fields.

It is one object of the present invention to provide means for generating and amplifying acoustic wave energy in a medium by directing electromagnetic radiation to the medium.

It is another object to provide means for generating and amplifying acoustic energy in a medium in response to incident electromagnetic radiation so that electromagnetic radiation of another frequency and of intensity within a few orders or magnitude of the intensity of the incident radiation is generated within the medium.

Another object of the invention is to provide means whereby acoustic wave energy in a solid or fluid medium is amplified by stimulated emission in response to electromagnetic radiation directed to the medium.

It is another object to provide a tunable source of intense coherent electromagnetic radiation.

It is another object to provide means for tuning an intense electromagnetic beam in a discrete or a continuous manner.

It is another object to provide means for broadening the envelope of laser frequencies by providing many sidebands.

It is another object to provide means for generating, amplifying and tuning relatively intense coherent acoustic waves in a medium.

It is another object to provide means for modulating beams of electromagnetic radiation by interactions with spatially coherent material waves produced by methods and means described herein or produced by stimulated Raman emission.

It is another object to provide means for generating electromagnetic radiation from material or acoustic waves.

It is another object to provide means for combining two substantially coherent beams of electromagnetic radiation in a medium to produce relatively intense material waves in the medium.

In accordance with one feature of the present invention, an intense beam of substantially coherent electromagnetic radiation is directed to a medium, the medium being selected so that acoustic waves of desired frequency and/or direction are generated and amplified in the medium by a process of amplification by stimulated emission. In conjunction with this, it is another feature to provide acoustic wave reflecting surfaces between which the acoustic wave is reflected in the manner of a reasonant cavity. By varying the angle of the reflecting surfaces with respect to the incident beam, a particular frequency acoustic wave can be singled out for amplification with feedback. The resonant cavity formed by the surfaces lowers the threshold power requirement of incident beam.

Another feature of the present invention arises from the above features and provides means for frequency modulating electromagnetic waves. A narrow spectrum beam of coherent radiation as, for example, from a laser is directed to a medium where the beam exchanges energy with acoustic waves accompanied by the generation of one or more directional and intense frequency sidebands of the beam. The exact frequency of each sideband depends on its direction relative to the angle of the incident beam, the medium, and the frequency of the incident beam.

Another feature provides a resonant optical cavity for the scattered electromagnetic waves enclosing the medium. This lowers the required threshold power of the incident radiation and providing feedback for any desired scattered electromagnetic frequency or sideband. Selection is made by varying the angle between the reflectors and the incident beam.

It is another feature to provide means for mixing two electromagnetic waves of different frequencies in order to produce acoustic waves at the difference frequency. In accordance with this feature two intense substantially coherent electromagnetic waves are directed to a medium, the angle between them being selected to produce acoustic waves of the desired frequency. An acoustic wave is generated and amplified from the mixing of the original beams through electrostrictive and/or piezoelectric coupling. In accordance with one feature of the invention, other extermally generated electromagnetic beams are directed into a medium in which acoustic waves have been generated and amplified. These beams are modulated by the acoustic waves, the direction of incidence determining the frequency of the sidebands.

In accordance with another feature of the present invention, other electromagnetic beams are directed into a medium in which spatially coherent material waves have been generated by means of the stimulated Raman effect. These beams are scattered and modulated by these coherent material waves when the direction of incidence is properly chosen.

A further feature of the present invention provides means for generating electromagnetic waves of the frequency of the material waves. If the material is properly chosen, or if a DC electric field is applied, material waves produced by stimulated Brillouin or Raman effects will have electric or magnetic multipole moments associated with them so that these oscillating moments produce electromagnetic radiation at the frequency of the material.

The phenomena which take place in some embodiments of the present invention are explained as follows; sidebands on a beam are produced by directing the beam to a medium in which stimulated Brillouin scattering occurs accompanied by a build up or amplification by stimulated emission of a coherent acoustic wave. The scattered radiation which is intense and substantially coherent is the sideband frequency, since it is shifted in frequency relative to the incident beam by the frequency of the acoustic waves.

This phenomenon is incorporated in an embodiment of the invention in which a beam of selected sideband or shifted frequency is directed back to the same laser device or to another laser device, the selected frequency or sideband being within the amplification bandwidth of the laser. Thus, the selected frequency is amplified and may be directed to a target or it may be redirected to the medium where it produces more sidebands which differ in frequency relative to the original incident laser beam by twice the acoustic wave frequency. Thus, a series of frequency components of laser radiation separated in frequency by the frequency of the acoustic wave and of decreasing intensity are produced.

In this embodiment, the new frequency components are all at lower frequencies than the original incident laser beam because, as will be shown below, the condition for a substantial exchange of energy between an electromagnetic and acoustic wave requires that the acoustic wave and scattered radiation travel in opposite directions. Thus, the shift of the scattered radiation relative to the incident radiation is to lower frequency and the envelope of frequency components appears as a folded envelope in which the upper sideband is folded over the lower.

In conjunction with the above feature, the envelope of electromagnetic radiation frequency components is unfolded in an embodiment in which the scattering medium is located inside a cavity which resonates the incident beam so that the incident beam travels through the medium in two opposite direction generating acoustic waves in two directions. In this embodiment of the invention, both upper and lower sidebands of the original incident beam are produced and the effect on output spectrum is to unfold the folded envelope of sidebands. It is suggested that this occurs because acoustic waves are generated which travel both in the same direction and in an opposite direction to the scattered radiation and so the frequency of this scattered radiation is Doppler shifted up as well as down relative to the frequency of the incident beam. Thus, the spectrum of the original beam may be given sidebands at any desired frequency close to the original beam frequency and these sidebands are of comparable intensity to the original beam.

These and other objects of the present invention will be apparent from the following specific description of embodiments of the invention and by reference to the figures in which.

The coupling of electromagnetic waves with sound waves in accordance with features of the present invention is due to the compression or expansion of a material or medium by the electric fields of the electromagnetic wave. The phenomena of electrostriction and piezoelectricity both relate to this appearance of mechanical strain when an electric stress is applied to matter. In simple notations, the relationship may be written as follows:

$$x = be + ae^2 + b'e^3 + a'e^2 \ldots \quad (1)$$

where the mechanical strain is given by $x$, the electric stress by $e$ and the coefficient by $a$ and $b$. The separation of coefficients into odd and even powers of $e$ serve to define the piezoelectric coefficients $b$ and electrostrictive coefficients $a$. From this it is seen that the mechanical strain due to electrostriction is independent of reversal of the direction of electric field whereas the mechanical strain due to piezoelectricity changes sign upon field reversal. The relationship also illustrates that the electrostrictive effect is unlike the piezoelectric effect in that it has no converse effect. For example, in accordance with the piezoelectric effect, an electric field produces a mechanical strain and likewise a mechanical strain will produce a net field in the material. This sort of reciprocal effect is not shared by pure electrostriction because a mechanical stress will not produce any polarization and, thus, it will not produce any net electric field in the material. The present invention contemplates the use of solid material such as sapphire, glass, or quartz or the use of fluids such as water, methanol, acetone, aniline and compressed gases, into which intense radiation is directed causing stimulated Brillouin scattering and the production and amplification of relatively high intensity acoustic waves.

Consider next the dominant effect on coupling between acoustic and electromagnetic waves, that is, electrostriction. It will be assumed here that this is the principal mechanism whereby energy is exchanged between the optical and acoustic waves, and, as will be seen, this is confirmed by some of the observations. The piezoelectric effect enters as the next higher order effect, and will be important in the generation of electromagnetic radiation at the frequency of the acoustic waves. Calculations for the piezoelectric effect are performed in much the same manner as the following. Electrostrictive pressure is given by the relationship $$P = \frac{E^2}{8\pi} \rho \frac{d\epsilon}{d\rho} \quad (6)$$

where $E$ is the electric field, $\rho$ the density of the medium, $\epsilon$ the dielectric constant of the material. Thus, if two electromagnetic waves are present, of frequencies differing by $f_s$, the electric fields of these two waves will drive a pressure wave of a frequency $f_s$ due to the quadratic dependence of pressure on the total electric field $E$ and the consequent generation of a beat frequency. In other words, the electrical fields of the two electromagnetic waves combine nonlinearly to drive a pressure wave, and so they generate a pressure wave at the beat frequency of the two electromagnetic waves. If it is assumed that the driving electromagnetic wave is intense such as obtained from a maser and of the form $$\vec{E}_0 \cos(\omega_0 \cdot t - \vec{k}_0 \cdot \vec{r})$$

and that the other electromagnetic wave which is the scattered wave is of the form $$\vec{E}_1 \cos[(\omega_0 - \omega_s)t - \vec{k}_1 \cdot \vec{r} + \phi_1]$$

and that the acoustic wave is of the form $p_0 \cos$ $$(\omega_s t - \vec{k}_s \cdot \vec{r} + \phi)$$

then the power transfer between the electromagnetic waves and the acoustic waves and the amplification may be calculated. For example, the acoustic wave causes a change in susceptibility of the medium. This change in susceptibility of the medium is due to the difference in pressure between fronts of rarefaction and compression of the acoustic wave. In the presence of E, the polarization change, $\Delta\mu$, is given by the following:

$$\Delta\mu = \frac{1}{4\pi} \frac{\alpha}{B} EP \quad (7)$$

where $$\alpha = \rho \frac{d\epsilon}{d\rho} \text{ and } B = \frac{1}{\rho} \frac{d\rho}{dp}$$

where $\rho$ is density, $\epsilon$ is dielectric constant, B is bulk modulus of the medium, $p$ is the pressure differential between rarefaction and compression fronts and E is the electric field strength of the electromagnetic wave. This polarization change produced by the acoustic wave feeds energy into the electromagnetic wave. With this expression and the wave formulae above, an expression for the power gain per unit volume of the electromagnetic waves, $P_{em}$, can be obtained:

$$P_{em} = -\frac{1}{4\pi} \frac{\alpha}{B} E \frac{d(Ep)}{dt} \quad (9)$$

Next consider the nature of the two electromagnetic waves and the acoustic waves and the above expressions of power generated per unit volume. It can be as shown that waves of an up converted frequency such as $\omega_0 + \omega_s$ are not amplified; however, the $E_1$ wave at the down converted frequency $\omega_0 - \omega_s$ is amplified. Thus, only the down converted electromagnetic wave and the acoustic wave need be considered.

Figures 1, 2:
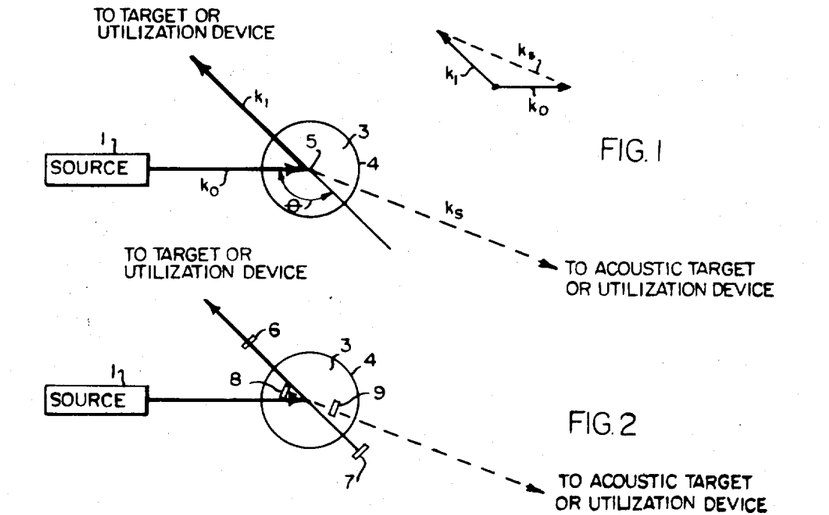
FIGURE 1 is a diagram including momentum vectors illustrating stimulated Brillouin scattering.
FIGURE 2 is a similar diagram illustrating the use of resonant cavities for the scattered electromagnetic and acoustic waves.

It can be shown that amplification for maximum gain of both the down converted wave and the acoustic wave will occur when the phase matching condition $$\vec{k}_0 = \vec{k}_1 + \vec{k}_s$$

is fulfilled. This represents the conservation of momentum between the incident and scattered electromagnetic waves and the acoustic wave. The significance of this condition is demonstrated by the diagram in FIGURE 1 which shows incident intense electromagnetic radiation of momentum $k_0 = hf_0/c$ from a suitable device, which may be, for example, a giant ruby laser producing 50 mw. bursts of 6940 A. light. This beam enters a medium 3 within a transparent container 4. When the electromagnetic radiation is sufficiently intense, stimulated Brillouin scattering occurs in the medium accompanied by the emission of a scattered light beam of wave vector $k_1 = nf_1/c$ and a sonic wave of wave vector $k_s$. This effect differs from the spontaneous Brillouin effect in that there is a distinct threshold for the power density of the incident beam, below which this effect is not observed at all. The directions and magnitudes of the wave vectors $k_1$ and $k_s$ are such that $$\vec{k_0} = \vec{k_1} + \vec{k_s}$$

and it is in these directions that the scattered light and acoustic waves experience maximum amplification.

The frequencies of the scattered light $f_1$ and acoustic waves $f_s$ are functions of the incident light frequency $f_0$ and the angle $\theta$ between the incident and scattered light. This relationship was stated by Brillouin and is as follows:

$$f_0 - f_1 = \frac{2f_0 v_s}{c} \sin \theta/2 \qquad (11)$$

where $v_s$ is the velocity of the acoustic wave and $c$ is the velocity of light in the medium. The equation is valid assuming the speed of propagation of $f_0$ and $f_1$ are the same in the medium and assuming that $v_s$ is much smaller than $c$. It was suggested by Brillouin that the scattered light is a reflection of the incident light from the acoustic wave fronts and, thus, the scattered light is shifted in frequency relative to the incident light by the Doppler effect and so, $f_s = f_0 - f_1$. This relationship is also obtained when it is assumed that the electric fields of two optical waves (the incident and scattered light) combine nonlinearly to drive an acoustic wave in accordance with principles of electrostriction. Thus, Equation 11 becomes $$f_s = \frac{2f_0 v_s}{c} \sin \theta/2 \qquad (12)$$

It can be shown that there is a threshold condition for the generation of acoustic and shifted electromagnetic waves. In the case of travelling wave interactions such as illustrated in FIGURE 1 where there is no resonant cavity either for the scattered light or acoustic wave and when the shifted electromagnetic wave is in the backward direction, this threshold reduces to $$\frac{E_0^2}{8\pi} = \frac{2\epsilon B}{\left(\rho \frac{dE}{d\rho}\right)^2} k_s k_1 \left(\frac{1}{L_s} + \frac{1}{L_1}\right)^2 \qquad (13)$$

where $L_s$ and $L_1$ the decay lengths or inverse effective absorption coefficients of the acoustic and scattered light waves, respectively. If, for example, $L_s = 10^{-2}$ cm. and $L_1 = 10^2$ cm., and for normal bulk moduli B in solids, then the power flow to meet the threshold condition for amplification is about $10^4$ megawatt/cm.². The maximum energy which can thus be fed into the acoustic waves is the fraction $\omega_s/\omega_0$, which is simply the ratio of phonon to photon energies and is of the order of $10^{-4}$ of the incident light photon energy. The maximum energy fed into the shifted light wave approaches that of the incident light waves. A substantial buildup of the acoustic wave and the scattered light wave during the short interval of a giant laser pulse may require light intensities which are substantially above the threshold condition and only under these conditions can the acoustic energy approach its maximum or will the intensity of the scattered light be sufficient to be readily detected.

The threshold power requirement is decreased substantially when both the shifted electromagnetic radiation and the acoustic waves are generated within resonant cavities. FIGURE 2 illustrates this type of operation. In FIGURE 2 the resonant cavity consists of two reflecting surfaces 6 and 7 (preferably outside the medium 3) an integral number of scattered light wavelengths, $\lambda_1$, apart defining an optical cavity resonant at the frequency $f_1$. In addition, two acoustic waves reflecting surfaces 8 and 9 comprise the acoustic cavity (preferably within the medium 3) an integral number of the acoustic wavelengths, $\lambda_s$ apart defining an acoustic cavity resonant at $f_s$. A threshold condition for a buildup of the acoustic and scattered light waves in this case can be derived to yield the following:

$$\frac{E_0^2}{8\pi} = \frac{2B}{\left(\rho \frac{d\epsilon}{d\rho}\right)^2 k_s L_s k_1 L_1} \qquad (14)$$

Figure 3:
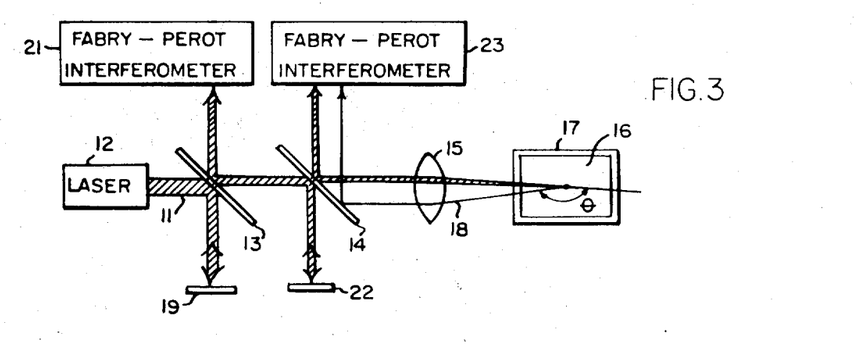
FIGURE 3 illustrates an optical system for observing the scattered light from a solid medium with interferometers.

FIGURE 3 illustrates an optical system whereby stimulated Brillouin scattered light can be observed with an interferometer or directed to utilization means. The beam 11 from a giant pulse ruby laser 12 producing, a single mode of 6940 A. light is directed through two beam splitters 13 and 14 to a lens 15 which focusses the beam within or just beyond a scattering medium 16 contained within a transparent container 17. The medium 16 may be solid of fluid and selected from a wide variety of available materials which will be enumerated later.

The intense laser beam 11 causes stimulated Brillouin scattering within the medium. A substantial part of the incident radiation will be back-scattered and shifted in frequency relative to the incident 6940 A. light in accordance with Equation 11 where $\theta = 180°$. One ray 18 of this back scattered light is shown.

A portion of the beam 11 is directed by beam splitter 13 to a plane mirror 19 of relatively high reffectivity and mirror 19 directs this portion of the beam to a Fabry-Perot interferometer 21. A fraction of the beam 11 is directed by the splitter 14 to plane mirror 22 which has relatively low reflectivity and which in turn directs a relatively small part of the beam to Fabry-Perot interferometer 23.

The Brillouin radiation scattered by the medium 16 in a backward direction is chosen for study because this radiation has maximum frequency shift and exhibits the least dependence of frequency on scattering angle. Thus, this back-scattered radiation leads to better resolution and higher accuracy of measurement of frequency shift. The back-scatter radiation represented by ray 18 is collected by the lens 15 and directed by the beam splitter 14 to the interferometer 23.

Figure 4:
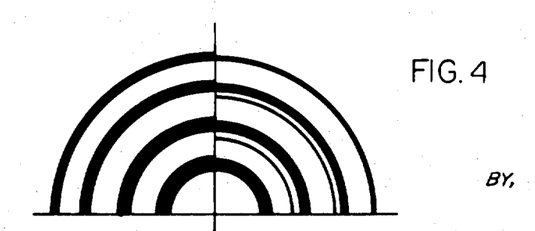
FIGURE 4 shows a typical interference pattern obtained with the optical system of FIGURE 3.

FIGURE 3 represents an experimental device utilizing the present invention with Fabry-Perot interferometers. The interference pattern produced when the scattering medium 16 is a crystal of quartz is illustrated in FIGURE 4. The experiments permit measurements of the frequency of the Brillouin scattered radiation as well as the relative intensity of this radiation. The pattern clearly shows that stimulated Brillouin scattering occurs in the quartz crystal. The left part of FIGURE 4 illustrates the interference pattern obtained with the interferometer 21 which is the interference pattern of the single mode of original radiation from the laser 12 having a frequency spread of less than .04 cm.$^{-1}$. The comparable interference pattern shown as the right hand part of FIGURE 4 obtained with the interferometer 23 clearly shows the same spectral line shown by the other pattern and in addition, shows the back-scattered line.

A variety of media can be employed in which the stimulated Brillouin scattering occurs and as mentioned these include solids such as crystalline materials, glasses, liquids and compressed gases. When, for example, the scattering medium 16 is a crystal of quartz or sapphire, in a system illustrated in FIGURE 3, it has been found that the scattered light as detected by the interferometer is shifted by as much as 2 cm.$^{-1}$ which corresponded to an acoustic wave frequency near $6 \times 10^{10}$ c.p.s. Included below is a brief chart listing crystal types, relative direction of incidence and scattered light, and the observed frequency shifts as measured with the interferometer as well as the calculated shifts obtained from theory.

TABLE I

| | Direction of incidence and scattering angle | Observed shft (cm.⁻¹) | Calculated shift (cm.⁻¹) |
|---|---|---|---|
| Crystal: | | | |
| Quartz | Z-Axis, 180° | 9.99 | 0.97 |
| | X-Axis, 180° | 0.85 | 0.88 |
| | Z-Axis, 90° | 0.73 | 0.70 |
| Sapphire | Z-Axis, 180° | 2.07 | 2.01 |

As can be seen in the above chart, all the observed shifts are in close agreement with those calculated from known constants of the crystalline materials. This agreement, coupled with the high intensity of scattered radiation observed leaves no doubt that stimulated Brillouin scattering was observed and that there was marked amplification and buildup from the acoustic waves. In some cases where a quartz crystal was employed and the power of the laser pulses was on the order of 50 megawatts during a 30 nanosecond interval, the buildup or amplification of the acoustic wave was so intense that the crystal was shattered.

The problem of shattered crystals can be entirely avoided by employing a fluid medium. Contrary to the case of crystals, neither the liquid nor the cell in which it is contained are damaged by the stimulated Brillouin effect. Thus, the use of fluids rather than crystals simplifies operation of stimulated Brillouin effect and opens the door to detailed studies that can be made of acoustic properties of liquids. In addition, the threshold required for generation of acoustic waves is lower for a number of fluids than for solids such as quartz and sapphire.

The use of stimulated Brillouin scattering in measuring acoustic velocities in a medium to a high degree of accuracy is advantageous. From the observed frequency shifts, acoustic velocities can be calculated using Equation 11. This has been demonstrated using experimental apparatus similar to that in FIGURE 5. The results are included below in a chart listing a number of liquids and measured values of Brillouin shift, from which the speed of sound $v_s$ is calculated. Also included is a column listing speed of sound in the same materials recorded by previous means.

TABLE II

| | Brillouin shift | Calculated $v_s$ | Previous $v_s$ |
|---|---|---|---|
| Liquid: | | | |
| CCl₄ | .141 | 1,007±7 | 1,040±27 |
| Methanol | .139 | 1,100±11 | |
| Acetone | .153 | 1,174±7 | 1,190±40 |
| CS₂ | .192 | 1,242±6 | 1,265±22 |
| H₂O | .188 | 1,471±8 | 1,509±25 |
| Aniline | .257 | 1,699±8 | |

Figure 5:
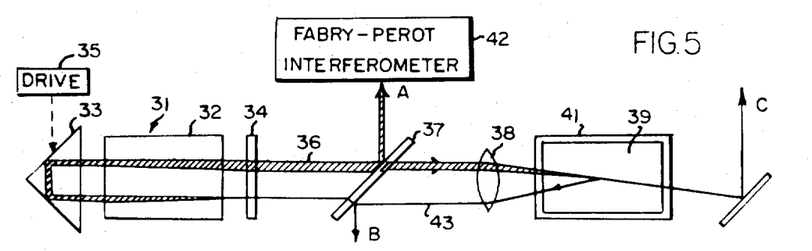
FIGURE 5 illustrates an optical system for generating and amplifying scattered light from a fluid producing an envelope of lower sidebands.

One very accurate experimental method for measuring frequency shift of the scattered beam is to observe microwave beats in the output from a photocathode mixer to which the Brillouin components are directed. The kilomegacycle beat frequency appearing in the output of the photocathode can be very precisely measured and of course this frequency is equal to the frequency of the acoustic wave and can be substituted in Equation 12 which is then solved for $v_s$. When the shifted electromagnetic radiation is substantially within the linewidth of the medium which produced the incident beam, the stimulated Brillouin scattering may be amplified by the medium. This radiation may then be redirected as an incident beam, causing another stimulated Brillouin shift. If this linewidth is large, as in neodymium doped glass, this amplification can be observed out to many orders of shifts even in solids where the Brillouin shifts are large. In the specific demonstrated case of ruby, the linewidth is such that many orders of backward Brillouin shifts are seen in liquids, but not in solids, where the shifts become comparable to the ruby amplification width. An optical system employing the incident beam laser in this manner is illustrated in FIGURE 5. The system includes a giant pulse ruby laser 31 comprised of a ruby rod 32, a rotated prism reflector 33 at one end and a partially reflecting mirror 34 at the other end. The device was demonstrated also without giant pulse operation (reflector 33 was stationary). A source pumping energy to the ruby is also included but not shown. The laser produced about 10 mw. of single mode 6940 A. light for about 30 nanoseconds when prism 33 was rotated by a drive mechanism 35. The laser beam 36 was directed through a beam splitter 37 to a lens system 38 which constricted the beam and directed it to a fluid medium 39 within a transparent container 41.

An interferometer such as a Fabry-Perot interferometer 42 was disposed to intercept part of the split beam from the beam splitter 37 and pictures taken of the interference pattern produced within this interferometer show the spectral lines of radiation in the output from the laser 31. In operation, the intense coherent beam 36 stimulates Brillouin scattering in the fluid medium 39 and a back-scattered ray 43 of substantial intensity and coherency emanates from the medium back through the lens system 38, through the beam splitting mirror 37 and into the laser 31 wherein this radiation is amplified, and directed back to the medium 39 causing its own stimulated Brillouin scattering. Thus, each cycle along the beam paths 36 and 43 produces a new spectral line of Brillouin scattered light, each of these spectral lines being shifted by an increasing integral multiple of the same acoustic wave frequency associated with the backward scattered direction. The spectrum of radiation at the output of the laser and Brillouin scattering may be observed at three sites denoted A, B, and C. Since most of the radiation emitted is collected at A, the spectrum will be most intense here.

Figure 6:
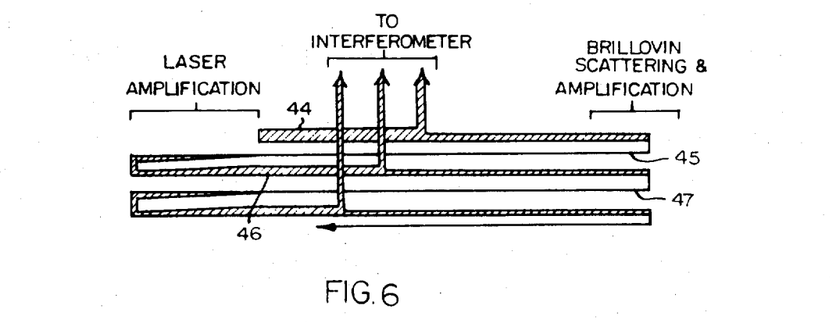
FIGURE 6 is a diagram showing light paths to aid in understanding the amplification process in the system of FIGURE 5.
Figure 7:
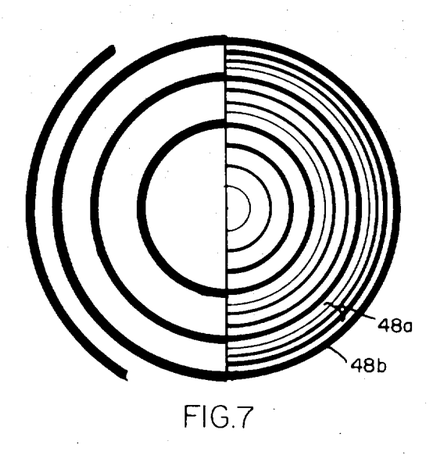
FIGURE 7 illustrates the type of interference pattern obtained with the optical system in FIGURE 5.

The recycling of light through the laser is illustrated in FIGURE 6 which shows the original single mode of laser radiation as a beam 44 which is first split by the action of the beam splitter so that part is directed to the interferometer and part is directed to the medium wherein stimulated Brillouin scattering occurs, producing a beam 45 of coherent radiation shifted once in frequency which is directed to the laser where it is amplified by stimulated emission inside laser by one or more reflections between the prism 33 and the flat mirror 34 producing another laser beam 46 of very intense coherent radiation of a frequency which differs from the frequency of the original beam by the frequency of acoustic wave generated in the fluid medium 39. This second laser beam 46 is split and part of it directed to the interferometer while the other part is directed to the medium producing a beam 47 of substantially coherent Brillouin scattered radiation, etc. With each cycle through the system accompanied by the production of a new line of stimulated Brillouin scattered light, a new spectral line of intense coherent radiation is produced at the output of the laser 31 and these lines are observed with the Fabry-Perot interferometer. A typical interference pattern obtained using the system illustrated in FIGURES 5 and 6 is shown in the right-hand part of FIGURE 7. The left-hand part of FIGURE 7 is a control pattern made with the scattered radiation blocked or with the scattering medium 39 removed. Thus, the left-hand pattern shows only the original incident single mode 6940 A. laser light while the right-hand pattern shows the original and a number of successive Brillouin back-scattered components. This pattern was observed using a Fabry-Perot interferometer placed at site A.

Figure 8:
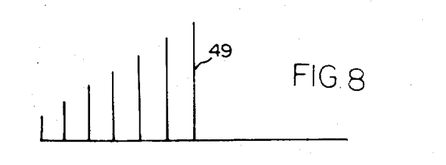
FIGURE 8 illustrates the envelope of amplified scattered radiation lines (sidebands of original incident laser beam) produced in the output of the system in FIGURE 5.

The same information illustrated in the right-hand side of FIGURE 7 is shown in FIGURE 8 as the envelope of the radiation directed the interferometer 42. The envelope of narrow spectral lines in FIGURE 8 appears to be a folded side band envelope of lines equally displaced in frequency and of decreasing intensity. Each of these lines corresponds to a single process of Brillouin scattering described above, and all are of lower frequency than the original line 49 emitted by the laser. The spectrum appears folded because the acoustic wave amplified in the medium by the incident radiation travels in the same direction as the incident radiation and so the scattered radiation travelling in the opposite direction is downshifted in frequency by the Doppler shift. The intensity at site B was so weak that neither the original laser beam nor the Brillouin scattered components could be observed by the Fabry-Perot interferometer at this site, and this, of course, is evidence that the Brillouin scattered components are being amplified by the laser 31 and follow the paths described. While the intensity of the Brillouin scattered light at site B was too weak to be detected by the Fabry-Perot interferometer, it seems quite clear that once this component is amplified by the laser and redirected back toward the medium 39 it is just about as intense as the original laser frequency and in fact is sufficiently intense to cause another Brillouin scattering. It appears that this process can occur a number of times using a ruby laser when the medium 39 is a liquid such as water, aniline or benzene. Evidence of this is the multitude of rings such as 48a adjacent to each of the original laser rings such as 48b in the right-hand side of FIGURE 7. The additional rings are clearly from Brillouin scattering of coherent radiation as all are amplified by the laser and are well within the linewidth of operation of the laser. This is not the case where the medium is a solid crystalline material rather than a liquid because the Brillouin scatterings caused with many solid materials are beyond the bandwidth of operation of the ruby and so the scattered radiation is not amplified by the ruby.

It might be speculated that the Brillouin components amplified in the ruby laser are from spontaneous Brillouin back-scattering rather than from stimulated Brillouin scattering. If such were the case, Brillouin shifts to higher frequencies would occur with the same intensity as shifts to lower frequencies and this has not been observed. Furthermore, it was also found that a large variation of the relative intensity of the Brillouin components and the original laser beam occurs even though the input laser power is varied only slightly. This behavior indicates a threshold and shows conclusively that stimulated emission rather than spontaneous backscattering dominates.

The envelope of intense lines shown in FIGURE 8 can be unfolded so that the laser output includes scattered frequencies up shifted as well as down shifted relative to the original single mode 6940 A. incident laser beam. This is accomplished by directing the incident beam from the laser through the medium in both of two opposite directions. As a result, acoustic wave trains of the same frequency and travelling in opposite directions will be generated and amplified within the medium. Furthermore, the incident beam from each direction will reflect from both acoustic wave trains and, thus, produce frequency up shifted as well as down shifted scattered radiation. An optical system for accomplishing this is illustrated in FIGURE 9.

Figure 9:
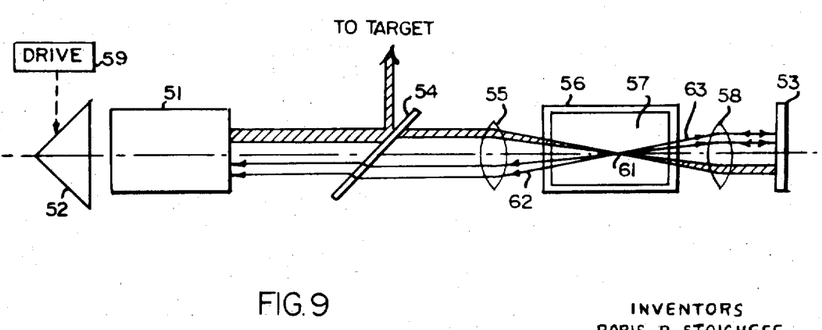
FIGURE 9 illustrates an optical system similar to that in FIGURE 5 and arranged to generate and amplify upper as well as lower frequency scattered radiation (upper and lower sidebands)
Figure 10:
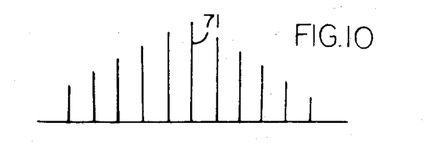
FIGURE 10 illustrates the envelope of upper and lower sidebands produced by the system shown in FIGURE 9.

The laser in FIGURE 9 includes an active medium 51, for example, a ruby rod, with a reflector 52 at one end. A device for Q switching may or may not be included. The optical path for the laser cavity includes the path through all the optical components between the back reflector and a totally reflecting mirror 53. This path includes the laser rod 51, a beam splitter 54, a lens system 55, the container 56 and the fluid scattering medium 57 and a second lens system 58 confocal with the lens system 55. As a specific example power is fed to a ruby rod 51 by a pumping system not shown and the prism 52 is rotated at high speed by drive means 59. Light generated within the ruby is reflected back and forth between the mirrors 52 and 53 and amplified in the ruby. This light may be restricted to a single mode by constructing mirror 53 with parallel sides.

When the intensity of light at the single mode which is amplified between the mirrors 52 and 53 reached the threshold, stimulated Brillouin scattering will be produced in the liquid medium 57. Since the incident beam will propagate through point 61 in the medium in two opposite directions, radiation shifted up in frequency and radiation shifted down in frequency wil be scattered in both of opposite directions such as scattered rays 62 and 63. The lens system 58 and mirror 53 directs the ray 63 back through the medium and along the same path as ray 62. Thus, the up shifted and down shifted scattered rays are directed along substantialy the same path back through the lens system 55 and beam splitter 54 to the ruby rod 51 wherein both are amplified by the process of stimulated emission.

The envelope of scattered frequencies directed toward a target by the beam splitter 54 appears as illustrated in FIGURE 8 and, as mentioned above, this envelope has the appearance of a double side band of requencies centered about the original single mode 6940 A. from the laser represented by line 71.

Figure 11:
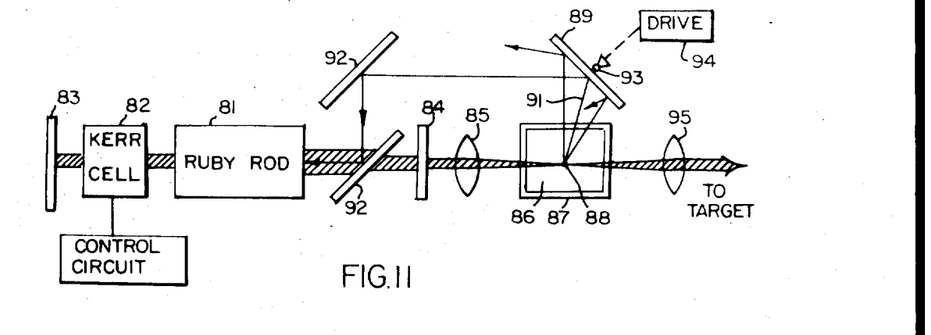
FIGURE 11 shows an optical system incorporating features of the invention for frequency modulating the output beam from a laser.

The dependence of scattered light frequency on the angle $\theta$ leads to a useful embodiment whereby the output light from a laser can be frequency modulated. A system for accomplishing this is illustrated in FIGURE 11. This includes a laser rod 81 with an optional Q-switcher such as Kerr cell 82, which acts as a light shutter between the rod and a totally reflecting plane mirror 83. The laser resonant cavity is defined by the light path between mirror 83 and a partially transparent mirror 84 disposed at the other end of the rod. In operation, bursts of high intensity, preferably single mode light, from the laser are directed by a lens system 85 to a fluid medium 86 in a transparent container 87. At or near the point of focus 88 in the medium stimulated Brillouin scattered light is produced and the frequency of this light is dependent upon the scattering angle as already shown. A segment of this scattered light is reflected by a rotatable plane mirror 89. Depending upon the position of the rotatable mirror 89, a narrow ray 91 (and thus a narrow frequency spread of scattered light) is directed to fixed mirror 92 and thence to a beam splitter 93 orientied to direct the ray along the resonant optical path between the mirrors 83 and 84. Thus, only the scattered rays 91 of a given frequency produced by scattering of the original single mode of laser light is amplified within the laser rod and appears at high intensity along with the original mode in the laser cavity between the mirrors 83 and 84.

When the miror 89 is rotated or vibrated about an axis 93 by suitable drive means 94 the frequency of the scattered ray fed back to the laser optical cavity is varied and so the frequency output from the laser is modulated. This modulated frequency can be separated from the original laser mode by a lens and filter system 95 and so the modulated frequency directed to a target.

Other structures operating in accordance with principal features of the system in FIGURE 11 can be employed so that modulation is accomplished by means other than the mechanical-optical means shown. For example, a multitude of reflecting electrically controlled shutters (such as Kerr cells) could be disposed each to intercept a different ray of scattered light and direct it onto the resonant optical path between the mirrors 83 and 84. Thus, the frequency of output radiation from the laser could be discretely shifted by electrical signals applied to the Kerr cells at rates susbtantially higher than with conventional mechanical means driving a mirror such as illustrated in FIGURE 11.

Figure 12:
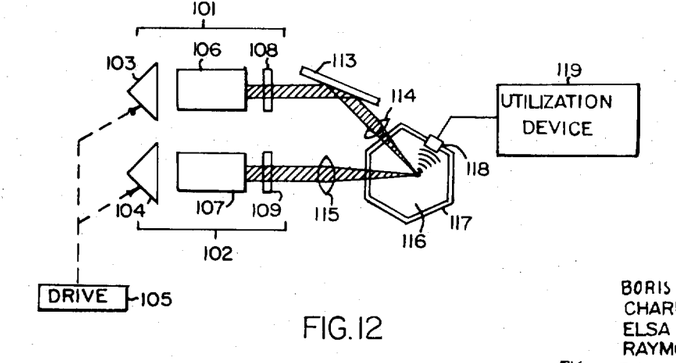
FIGURE 12 illustrates an optical system incorporating features of the invention for generating and driving an acoustic wave with two incident laser beams.

Stimulated Brillouin scattering, as already mentioned, can be considered to be the non-linear combining of two electromagentic waves (the incident and the scattered optical waves) which drive an acoustic wave. The electric fields of the two waves add and cause a compression in the medium which is proportional to the square of the summation of fields. This compression gives rise to an acoustic wave. Thus, the two optical waves combine nonlinearly and drive compression waves at their sum frequency and difference frequency. This model of stimulated Brillouin scattering suggests another structure for generating and driving an acoustic wave with optical energy. Such a structure is illustrated in FIGURE 12. Two lasers 101 and 102, preferably designed to produce single modes of slightly different frequency, are fired in synchronism. Such synchronism can be achieved by rotating prism mirrors 103 and 104 together with a common drive 105. The prism mirrors 103 and 104 combine with laser rods 106 and 107, partially transparent mirrors 108 and 109, respectively, and sources of pumping energy (not shown) to form the two lasers.

The single mode output frequencies from the lasers preferably differ by a frequency in the microwave range at which it is desired to generate acoustic waves. This can be accomplished for example, by employing ruby lasers at slightly different temperatures. The angle between the two laser beams is chosen appropriate for the desired frequency, by means of mirror 113. The beams 111 and 112 from the two lasers are focussed by a lens system 114 and 115 on the scattering medium 116 in a transparent container 117. The combined beam drives an acoustic wave in the medium which impinges upon an acoustic wave transducer or transmission means 118 coupled to a utilization device 119.

One way of utilizing these acoustic waves is to modulate or shift the frequency of additional light wave from another source. By choosing appropriate directions and materials, the incident beam can be shifted up or down in frequency by the desired amount and is redirected at an angle determined by momentum conservation.

This type of modulation can be produced in the same manner by utilizing coherent material vibrational waves produced by stimulated Raman emission in the same types of materials. This produces much higher frequency shifts.

If the material vibrations are or can be made infrared active, for example, by application of a DC electric field, the coherent vibrations will produce coherent infrared radiation of sizable intensity in a directional beam. If acoustic waves are generated in piezoelectric materials or in the presence of a DC electric field, as shown above, the mechanical strain will set up electrical stresses. This produces an electric field oscillating at the acoustic frequency and electromagnetic radiation at this frequency can be obtained from the medium.

This completes a description of a number of embodiments of the present invention whereby electromagnetic and material waves are generated and amplified in a medium in response to intense incident electromagnetic radiation of a substantially coherent nature thereby providing a number of useful functions such as driving a laser at selected frequencies so as to modulate the laser output frequency and generating very intense acoustic waves in a medium. The specific examples of apparatus and materials described herein, however, are made only by way of example and do not limit the spirit and scope of the invention as set forth in the accompanying claims.

What is claimed is:

1. A device producing relatively intense electromagnetic wave energy comprising, means for directing a sufficiently intense beam of substantially coherent electromagnetic radiation to a medium to produce therein stimulated Brillouin scattered electromagnetic radiation of a different frequency and stimulated scattered acoustic waves in said medium and means for directing the scattered electromagnetic radiation to suitable targets.

2. A device as in claim 1 and in which,
the frequency of said intense radiation directed to said medium is $f_0$,
the frequency of said stimulated scattered radiation is $f_1$,
the frequency of said stimulated scattered acoustic wave is $f_s$, and
the minimum intensity of said radiation at frequency $f_0$ is given substantially by the relationship:

$$\frac{E_0^2}{8\pi} = \frac{2\epsilon B}{\left(\rho\frac{d\epsilon}{d\rho}\right)^2} K_s K_1 \left(\frac{1}{L_s} + \frac{1}{L_1}\right)^2$$

where
$L_s$ and $L_1$ are decay lengths of the acoustic and scattered light waves, respectively,
$\rho$ is the density of the medium,
$\epsilon$ is the dielectric constant of the medium,
$B$ is the bulk modulus of the medium,
$K_1$ is the wave vector of said scattered radiation, and
$K_s$ is the wave vector of said acoustic waves.

3. A device as in claim 2 and further including,
means for directing the scattered electromagnetic radiation at frequency $f_1$ to suitable targets,
said directing means being so designed to select scattered radiation at an angle $\theta$ relative to the direction of said radiation at frequency $f_0$,
said angle $\theta$ being defined by the relationship $$f_0 - f_1 = \frac{2f_0 V_s}{c} \sin\frac{\theta}{2}$$

where $V_s$ is the velocity of said acoustic wave and $c$ is the velocity of said electromagnetic waves in said medium.

4. A device as in claim 3 and further including,
means enclosing at least a portion of said medium defining an acoustic cavity, resonant at the frequency $f_s$ of said acoustic waves, the axis of said acoustic cavity lying substantially along the path of said acoustic waves, and
means for directing acoustic wave energy from said cavity to a suitable target.

5. A device producing relatively intense electromagnetic radiation to a medium selected to produce stimulated ciently intense beam of substantially coherent electromagnetic radiation to a medium selected to produce stimulated Brillouin scattering of electromagnetic radiation of a different frequency in response to said beam and means for directing the scattered electromagnetic radiation to suitable targets.

6. A device producing relatively intense electromagnetic wave energy comprising, means for directing an intense beam of substantially coherent electromagnetic radiation to a medium substantially transparent to said radiation, said medium and the intensity of said beam being such that substantially coherent stimulated Brillouin electromagnetic radiation of a frequency different from said beam is produced within said medium accompanied by stimulated scattered acoustic waves in said medium and means for directing the last mentioned coherent electromagnetic radiation to utilization means.

7. A device for producing acoustic wave energy comprising means for directing a sufficiently intense beam of substantially coherent electromagnetic radiation to a medium to produce stimulated Brillouin scattered acoustic wave energy therein, and means for directing said acoustic wave energy generated within the medium in response to said beam to suitable targets.

8. A device for producing acoustic wave energy comprising means for directing a sufficiently intense beam of substantially coherent electromagnetic radiation to a medium selected to produce stimulated Brillouin scattered radiation in response thereto and means for directing acoustic wave energy generated within the medium in response to said beam to suitable targets.

9. A device for amplifying acoustic waves comprising means for directing a sufficiently intense beam of substantially coherent electromagnetic radiation to a medium to produce and amplify acoustic stimulated Brillouin scattered waves therein and means for directing said amplified acoustic waves to suitable targets.

10. A device for amplifying acoustic waves comprising means for directing a relatively intense beam of substantially coherent electromagnetic radiation to a medium selected to produce substantial stimulated Brillouin scattered radiation in response thereto, and means for directing acoustic wave energy generated and amplified within said medium in response to said intense beam to a utilization device.

11. A device for producing substantially coherent stimulated Brillouin scattered electromagnetic radiation and acoustic wave energy by a process of amplification by stimulated emission comprising, a laser device, means for directing a sufficiently intense beam of substantially coherent electromagnetic radiation from said laser device to a selected medium to produce and amplify said scattered radiation and acoustic wave energy therein and means for directing said amplified scattered radiation and amplified acoustic wave energy produced in said medium to suitable targets.

12. A device for producing substantially coherent electromagnetic radiation and acoustic wave energy by a process of amplification by stimulated emission comprising, a laser device, means for directing a sufficiently intense beam of substantially coherent electromagnetic radiation from said laser device to a selected medium selected to produce stimulated Brillouin scattering in response thereto and means for directing said scattered radiation and acoustic wave energy to suitable targets.

13. A device for producing stimulated Brillouin scattering electromagnetic radiation and acoustic wave energy by a process of amplification by stimulated emission comprising laser means, means for directing the beam from said laser means to a medium and means for directing said amplified scattered radiation and said acoustic wave energy to suitable targets.

14. A device for producing a beam of substantially coherent stimulated Brillouin scattered electromagnetic radiation and acoustic wave energy by a process of amplification by stimulated emission comprising, a laser device producing a sufficiently intense beam of single mode substantially coherent electromagnetic radiation directed to a selected medium so that said scattered radiation and acoustic wave energy are produced therein and means for directing radiation scattered in a selected direction and acoustic wave energy propagating in a selected direction to suitable targets.

15. A device producing substantially coherent light of a selected frequency comprising means for directing an intense beam of substantially coherent light of another frequency to a medium producing stimulated Brillouin scattered light, means forming an optical cavity containing said medium and resonant at said selected frequency and means directing said light of selected frequency from said cavity to a suitable target.

16. A device as in claim 15 and in which, the frequency of said intense radiation directed to said medium in $f_0$, the frequency of said stimulated scattered radiation is $f_1$, the frequency of said stimulated scattered acoustic wave is $f_s$ and, the minimum intensity $E_0$ of said radiation at frequency $f_0$ is given substantially by the relationship:

$$\frac{E_0^2}{8\pi} = \frac{2B\epsilon}{\left(\rho\frac{d\epsilon}{d\rho}\right)^2 K_s L_s K_1 L_1}$$

where
  $L_s$ and $L_1$ are decay lengths of the acoustic and scattered light waves, respectively,
  $\rho$ is the density of the medium,
  $\epsilon$ is the dielectric constant of the medium,
  $B$ is the bulk modulus of the medium,
  $K_1$ is the wave vector of said scattered radiation, and
  $K_s$ is the wave vector of said acoustic wave.

17. A device as in claim 16 and in which, the angle $\theta$ defined by the axis of said optical cavity and the direction of said radiation at frequency $f_0$ is defined by the relationship $$f_0 - f_1 = \frac{2f_0 V_s}{c} \sin\frac{\theta}{2}$$

18. A device as in claim 32 and further including, means enclosing at least a portion of said medium defining an acoustic cavity, resonant at the frequency $f_s$ of said acoustic wave, the axis of said acoustic cavity lying substantially along the path of said acoustic wave, and
  means for directing acoustic wave energy from said cavity to a suitable target.

19. A device producing substantially coherent electromagnetic wave energy comprising laser means producing a single mode of substantially coherent light, means directing said laser light to a medium producing stimulated Brillouin scattered light of a different frequency, means forming an optical cavity containing said medium and resonant at said different frequency and means directing said scattered light from said cavity to a suitable target.

20. A device for producing acoustic wave energy by stimulated Brillouin scattering comprising means for directing a relatively intense beam of substantially coherent radiation to a medium, means enclosing at least a portion of said medium defining an acoustic cavity resonant at the frequency of said acoustic waves and means for directing acoustic wave energy from said cavity to a suitable target.

21. A device for producing acoustic wave energy comprising means for directing a beam of substantially coherent light of sufficient intensity to cause stimulated Brillouin scattering of light in the medium, means enclosing at least a portion of said medium wherein said scattering occurs defining an acoustic cavity resonant at the frequency of said acoustic waves and means for directing acoustic wave energy from said cavity to a suitable target.

22. A device for producing substantially coherent stimulated Brillouin scattered electromagnetic radiation and acoustic wave energy by a process of amplification by stimulated emission comprising, means for directing a relatively intense beam of substantially coherent electromagnetic radiation to a selected medium, an optical cavity resonant at the frequency of said scattered electromagnetic radiation enclosing at least a portion of said medium, an acoustic cavity resonant at the frequency of said acoustic wave energy and enclosing at least a portion of said medium and means for directing amplified scattered radiation from said optical cavity and for directing amplified acoustic wave energy from said acoustic cavity to suitable targets.

23. A device producing relatively intense electromagnetic wave energy comprising laser means for directing an intense beam of substantially coherent electromagnetic radiation, to a medium producing stimulated Brillouin scattered electromagnetic radiation of a different frequency, means for directing said scattered electromagnetic radiation to said laser means wherein said scattered electromagnetic radiation frequency is amplified and means directing said amplified scattered electromagnetic radiation to a suitable target.

24. A device producing relatively intense electromagnetic wave energy comprising means for directing a sufficiently intense beam of substantially coherent electromagnetic radiation, to a medium producing stimulated Brillouin scattered electromagnetic radiation of a different frequency, means for directing said scattered electromagnetic radiation to laser means wherein said scattered electromagnetic radiation frequency is amplified and means directing said amplified scattered electromagnetic radiation to a suitable target.

25. A device producing relatively intense electromagnetic wave energy comprising laser means producing an intense beam of substantially coherent electromagnetic radiation, means for directing said beam to a medium producing stimulated Brilliouin scattered electromagnetic radiation, means for directing said scattered radiation to said laser means wherein said scattered radiation is amplified, means for directing said amplified scattered radiation to said medium producing another eschelon of scattered radiation, said directing means thereby serving to direct a multitude of eschelons of scattered radiation to said laser means wherein said eschelons of scattered radiation are amplified and means for directing the output of said laser means to a suitable target.

26. A device producing relatively intense electromagnetic wave energy comprising laser means producing an intense beam of substantially coherent electromagnetic radiation, means for directing said beam to a medium producing stimulated Brillouin scattered electromagnetic radiation of a different frequency, means for directing said scattered radiation of different frequency to laser means wherein said scattered radiation is amplified, means for directing said amplified scattered radiation to a medium producing another eschelon of stimulated Brillouin scattered radiation of a second different frequency, said directing means thereby serving to direct a multitude of eschelons of scattered radiation to laser means wherein said eschelons of scattered radiation are amplified and means for directing the output of said laser means to a suitable target.

27. A device producing a relatively intense beam of substantially coherent electromagnetic wave energy comprising laser means producing a beam of input radiation, means for directing said beam to a medium, producing stimulated Brillouin scattered electromagnetic radiation of a different frequency, means for amplifying said scattered radiation, means for directing said amplified scattered radiation to a medium producing a second eschelon of stimulated Brillouin scattered radiation, means for repeating this scattering and amplification a number of times producing relatively intense radiation of substantially different frequency from the frequency of said input beam and means for directing the various eschelons of amplified scattered radiation of different frequencies to utilization devices.

28. A device producing relatively intense electromagnetic wave energy comprising laser means including an active medium first reflecting means adjacent said medium, and second reflecting means adjacent said medium and a second medium disposed between said second reflecting means and said active medium producing stimulated Brillouin scattered electromagnetic radiation in response to laser radiation directed therethrough by reflection between said first and second reflecting means.

29. A device producing relatively intense electromagnetic wave energy comprising laser means including an active material, first reflecting means at one end of said material, second reflecting means at the other end of said material and means disposed between said second reflecting means and said material including a medium producing stimulated Brillouin scattered electromagnetic radiation in response to laser radiation directed therethrough by reflection between said first and second reflecting means.

30. A device producing a spectrum of relatively sharp lines of electromagnetic wave energy comprising a body of active material in which laser action occurs, first reflecting means at one end of said body, second reflecting means displaced from the other end of said body and means disposed between said second reflecting means and said body including a medium producing stimulated Brillouin scattered electromagnetic radiation in response to substantially monochromatic electromagnetic radiation directed therethrough by reflection between said first and second reflecting means.

31. A laser device comprising first and second reflecting means displaced from each other defining an optical cavity, a first active medium disposed within said cavity and a second medium disposed within said cavity producing stimulated Brillouin scattered electromagnetic radiation in response to said radiation amplified in said active medium.

32. A laser device comprising first and second reflecting means displaced from each other defining an optical cavity, a first medium disposed within said cavity, means for directing energy to said first medium from an external source producing electromagnetic radiation therein by the process of stimulated emission and a second medium disposed within said cavity producing stimulated Brillouin scattered electromagnetic radiation in response to said radiation.

33. A laser device comprising first and second reflecting surfaces displaced from each other defining an optical cavity, a first medium disposed within said cavity to which energy is directed from an exterior source causing the generation and amplification of electromagnetic radiation therein by the process of stimulated emission and a second medium disposed within said cavity producing stimulated Brillouin scattered electromagnetic radiation in response to said amplified radiation reflected within said cavity.

34. A laser device comprising an active medium in which laser action occurs, first reflecting means at one end of said active medium, second reflecting means at another end of said active medium, and means disposed between said second reflecting means and said active medium including a medium producing stimulated Brillouin scattered electromagnetic radiation in response to radiation directed therethrough by reflection between said first and second reflecting means.

35. An electromagnetic radiation modulation device comprising laser means producing an intense beam of substantially coherent electromagnetic-radiation, means for directing said beam to a medium producing stimulated Brillouin scattered radiation, means for directing said scattered radiation in a selected direction to said laser means, and means for varying said selected direction.

36. A tunable laser device comprising a laser means for producing an intense beam of substantially monochromatic electromagnetic-radiation, means for directing said beam to a medium producing stimulated Brillouin scattered radiation of a frequency dependent upon the direction of said scattered radiation relative to said beam, means for directing said scattered radiation to said laser means, and means for varying said directing means whereby the frequency output of said laser means is modulated.

37. A frequency modulated laser device comprising means producing an intense beam of electromagnetic-radiation, means for directing said beam to a medium producing stimulated Brillouin scattered radiation, means for directing said scattered radiation in selected directions to said laser device, and means for modulating said selected direction.

References Cited

UNITED STATES PATENTS 3,205,370  9/1965  Ashkin et al. __________ 330—5

OTHER REFERENCES

Eckhardt et al.: "Physical Review Ltrs.," Dec. 1, 1962, pp. 455–457.

Chiao et al.: "Physical Review Ltrs.," May 25, 1964, pp. 592–595.

ROY LAKE, Primary Examiner

DARWIN R. HOSTETTER, Assistant Examiner

U.S. Cl. X.R.

310—8.1, 8.2; 321—69; 330—3, 4.3, 4.5, 5.5; 332—7.51; 340—15

UNITED STATES PATENT OFFICE
CERTIFICATE OF CORRECTION

Patent No. 3,469,107                          September 23, 1969

Charles H. Townes et al.

It is certified that error appears in the above identified patent and that said Letters Patent are hereby corrected as shown below:

Column 1, line 20, insert as a new paragraph -- The invention described herein was made in performance of work under a NASA contract and is subject to the provisions of Section 305 of the National Aeronautics and Space Act of 1958, Public Law 85-568 (72 Stat. 435; 42 U.S.C. 2457). --. Column 5, line 75, after "present," insert -- $f_o$ and $f_1$ --. Column 6, line 9, after "wave" insert -- $f_o$ --; line 14, after "wave" insert -- $f_1$ --. Column 7, lines 45 to 50, and column 14, lines 5 to 8, the equations, each occurrence, should appear as shown below:

$$\frac{E_o^2}{8\pi} = \frac{2\varepsilon B}{(\rho \frac{d\varepsilon}{dp})^2 k_s k_1} \left(\frac{1}{L_s} + \frac{1}{L_1}\right)^2$$

Column 8, lines 8 to 13, the equation (14) should appear as shown below:

$$\frac{E_o^2}{8\pi} = \frac{2\varepsilon B}{(\rho \frac{d\varepsilon}{dp})^2 k_s L_s k_1 L_1}$$

Column 16, after line 10 insert -- where $V_s$ is the velocity of said acoustic wave and c is the velocity of said electromagnetic waves in said medium. --.

Signed and sealed this 13th day of October 1970.

(SEAL)
Attest:

EDWARD M. FLETCHER, JR.                      WILLIAM E. SCHUYLER, JR.
Attesting Officer                              Commissioner of Patents